United States Patent [19]
LaPorte et al.

[11] Patent Number: 5,423,509
[45] Date of Patent: Jun. 13, 1995

[54] COMBINATION BEVERAGE CONTAINER AND STEREO HOLDER

[75] Inventors: Richard LaPorte, Glenwood; Robert L. Waterhouse, Lemont, both of Ill.

[73] Assignee: Quick Technologies, Inc., Elmhurst, Ill.

[21] Appl. No.: 237,193

[22] Filed: May 3, 1994

[51] Int. Cl.⁶ .............................................. A47K 1/08
[52] U.S. Cl. .......................... 248/311.2; 224/30 A; 224/41
[58] Field of Search ............... 248/311.2, 313, 230, 248/231; 224/41, 36, 30 A, 31

[56] References Cited

U.S. PATENT DOCUMENTS

| | | | |
|---|---|---|---|
| 597,318 | 1/1898 | Jenks | 224/39 R |
| 4,415,105 | 11/1983 | Jackson | 224/30 A X |
| 4,436,350 | 3/1984 | Jolin | 248/230 |
| 4,570,835 | 2/1986 | Criqui | 224/36 |
| 4,640,449 | 2/1987 | Blackburn | 224/30 A X |
| 4,662,547 | 5/1987 | Villanueva | 224/30 A |
| 4,697,725 | 10/1987 | Miree | 224/41 |
| 4,754,901 | 7/1988 | Villanueva | 224/36 X |
| 4,756,454 | 7/1988 | Villanueva | 224/41 X |
| 4,981,243 | 1/1991 | Rogoinski | 224/36 X |
| 5,106,001 | 4/1992 | Figinski | 224/31 |

*Primary Examiner*—J. Franklin Foss
*Attorney, Agent, or Firm*—Lee, Mann, Smith, McWilliams, Sweeney & Ohlson

[57] ABSTRACT

A combination holder for beverage containers and personal stereos or recorders for mounting on stationary exercise equipment or the like. The holder generally has a cavity for holding a personal stereo, recorder or other device. The holder also has a generally circular opening for insertion of a beverage container. Wire legs extend outwardly from the holder beneath the circular opening to support the beverage container. The holder is secured to the bar of exercise equipment by wrapping attached straps having hook and loop material around a horizontal bar of the exercise equipment.

6 Claims, 2 Drawing Sheets

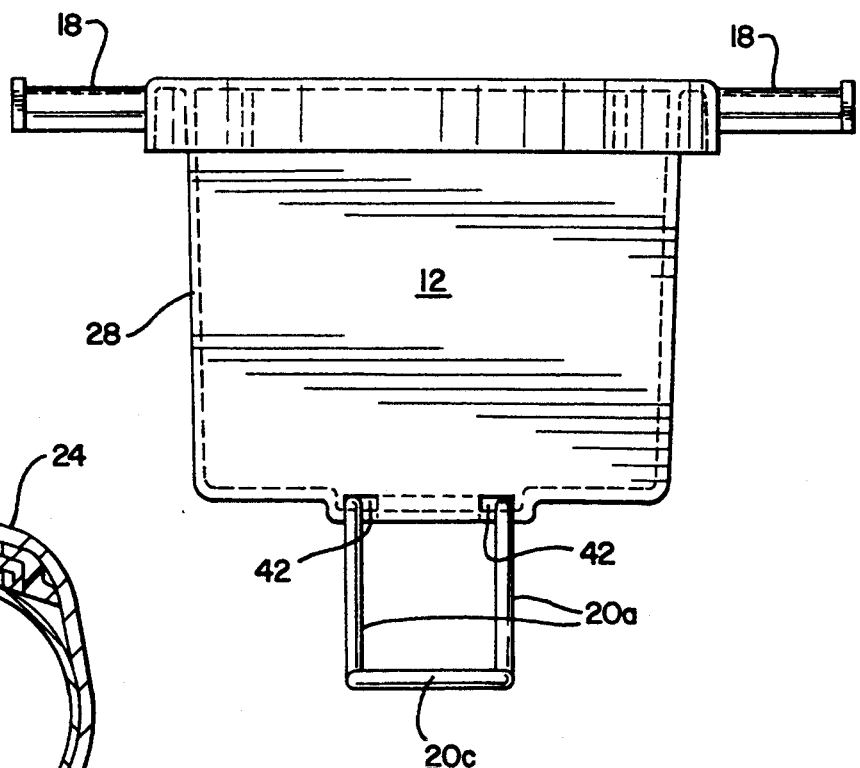
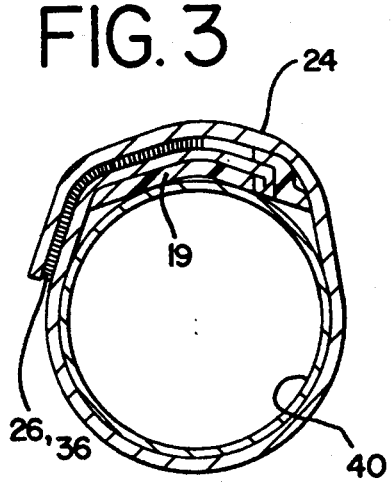
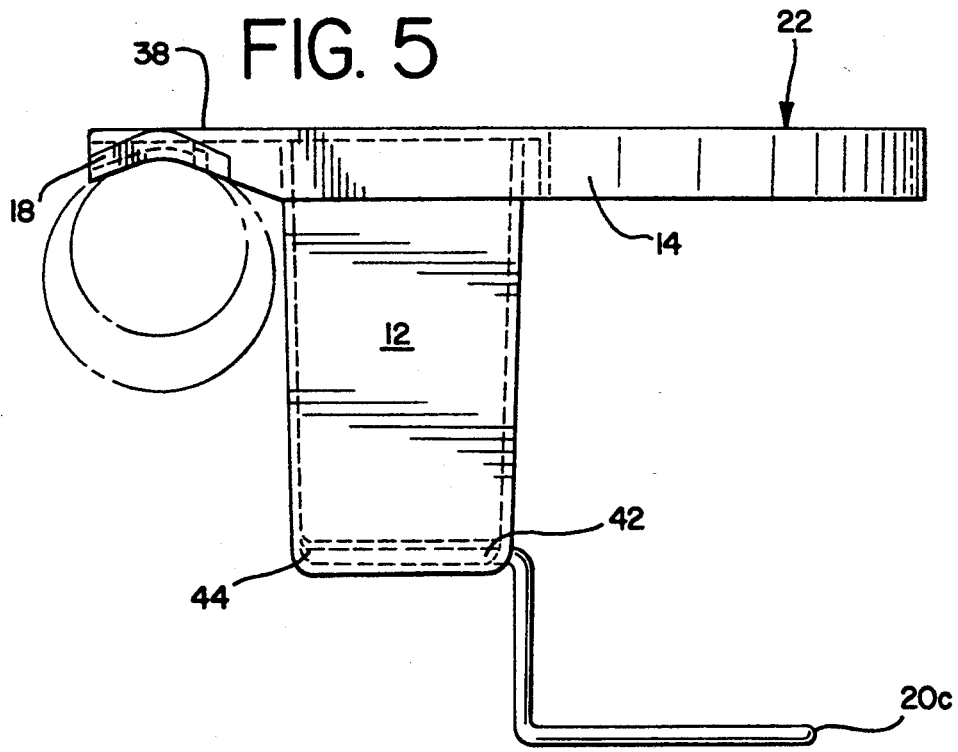

COMBINATION BEVERAGE CONTAINER AND STEREO HOLDER

BACKGROUND OF THE INVENTION

This invention relates to a combination beverage container and stereo holder for exercise equipment and bicycles.

When using stationary exercise equipment, it is often desirable to be able to take periodic drinks from a beverage can or the like. It is also desirable to be able to listen to tape recordings or radio broadcasts. There is a lack of safety and convenience in carrying a beverage holder or personal stereo in one hand while at the same time using exercise equipment. It may be also uncomfortable or inconvenient to have a personal stereo attached to one's clothing while using exercise equipment.

Various types of beverage holders and article holders exist in prior art. For example, beverage holders for bicycles have included structures consisting of bottom and top plates and means for spacing the interconnecting top and bottom members. The plates are mounted on a bicycle support and hold the beverage container, such as set forth in U.S. Pat. No. 4,071,175.

Another example of the prior art, used to hold other items on a bicycle, is U.S. Pat. No. 4,856,744. This patent discloses a structure which provides a myriad of hook configurations and demountable attachment sections for securing of loose articles such as purses, sweaters, towels or other loose items.

Although prior art exists for mounting beverage containers on stationary exercise equipment, and also for holding other articles, it would be inconvenient, as well as impractical, to have separate structures for holding separate items on the same piece of exercise equipment. Also, such structures are unsightly and their use is inconvenient.

SUMMARY OF THE INVENTION

In accordance with the present invention, a combination beverage container holder and personal stereo holder is provided that is ideally suited for holding both a beverage container and a stereo together while attached to a horizontal bar of exercise equipment. Instead of a stereo, other items such as a channel changer, cordless or cellular telephone, or a remote control for electronic equipment can be held. The holder, according to the present invention, has the advantage of being easily adaptable for mounting to bars of various sizes and shapes, such as cross bars, handle bars and the like. It is relatively easy and inexpensive to manufacture. While being easy to attach to one piece of exercise equipment, it is also easy to detach for mounting to another piece of exercise equipment.

According to the present invention, a combination beverage container holder and stereo holder is provided that includes an integrally formed body having a top section and a bottom section. The top section has generally circular opening at one end for insertion of a beverage container, and a handle engaging means for attachment of the holder to a horizontal bar of a piece of exercise equipment at the other end. The handle engaging means of the preferred embodiment has two straps at opposing ends. The straps have Velcro-type loop material, on one side and hooking material on the other side. When attached to a horizontal bar of an exercise machine, the straps are wrapped around the bar, and secured in place by the hooking material of straps lockingly engaging with the loop material, thereby securing the holder to the exercise equipment. The bottom section is located between the two ends of the top section and extends downwardly forming a cavity of sufficient size for insertion of a personal stereo or recorder. A support means extends outwardly from the bottom section and beneath the circular opening to support a beverage container.

BRIEF DESCRIPTION OF THE DRAWINGS

The invention is described in greater detail in the following description of an example embodying the best mode of the invention, taken in conjunction with the drawing figures, in which:

FIG. 3 is a cross-sectional view of an extended section and attachment strap, illustrating the strap wrapped around the extended section and a handle bar.

FIG. 4 is a front elevational view of the combination beverage container and stereo holder device.

FIG. 5 is a side view of the combination beverage container and stereo holder device illustrating the orientation of the straps.

DESCRIPTION OF AN EXAMPLE EMBODYING THE BEST MODE OF THE INVENTION

Figure 1:
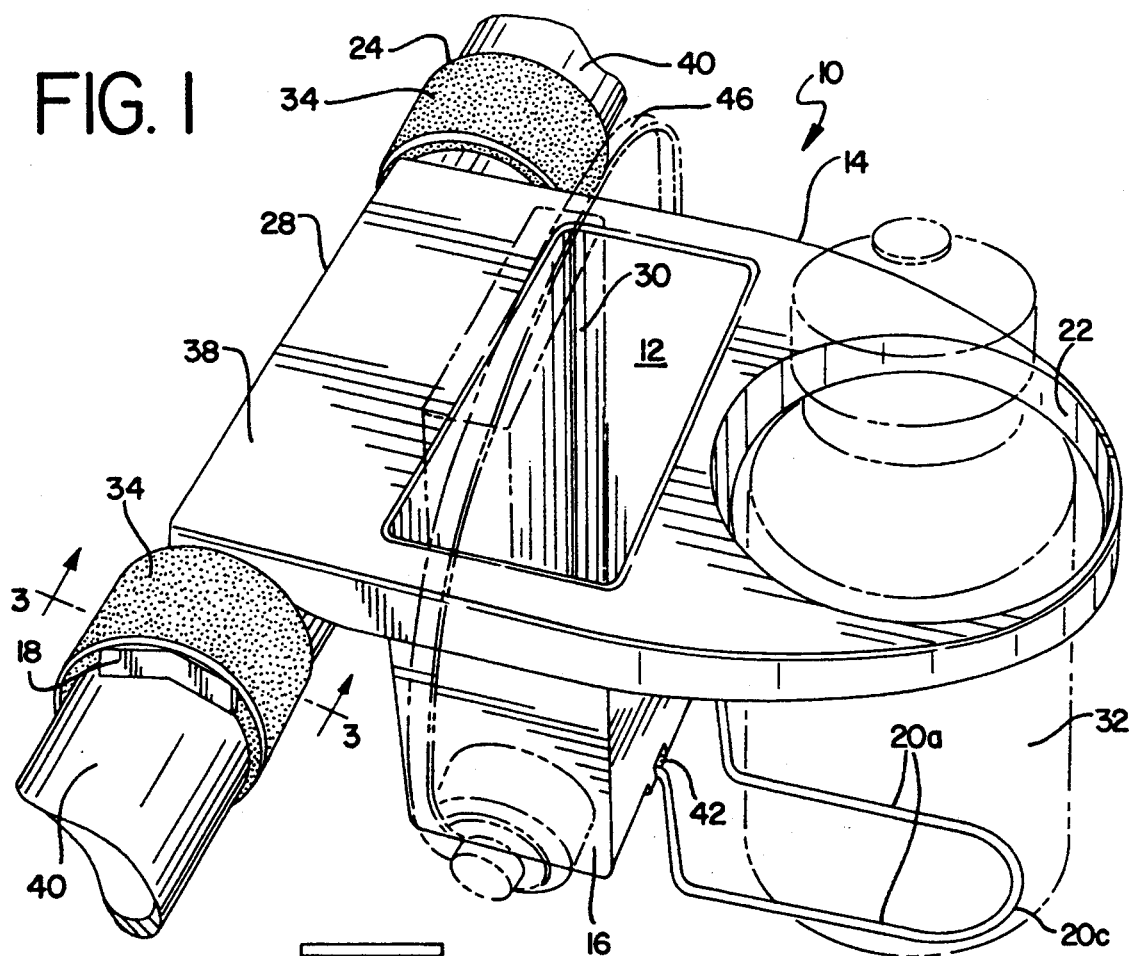
FIG. 1 is a perspective view of a combination beverage container and stereo holder according to the present invention and illustrating the device mounted on a bar which is only shown fragmentarily. Also illustrated in phantom is a beverage container and stereo held in the device, as well as headphones attached to the device.

Referring now to the drawings in more detail, reference numeral 10 generally designates a combination beverage container and stereo holder device constructed in accordance with a preferred embodiment of the present invention. The device includes an integrally formed body portion 28 having a top section 14 and a bottom section 16.

The top section 14 has a generally circular opening 22 at one end. The opening 22 is large enough in diameter to easily receive a standard size beverage container such as the container 32 shown in phantom in FIG. 1. At the other end of the top section 14 is rear overhanging portion 38. Extending outwardly from each side of the overhanging portion 38 of the top section 28 are inverted V-shaped members 18. The inverted V-shaped members 18 are preferably integral with the body 28, and are underlain by a rubber gasket 19 for increased friction. Attached to each inverted V-shaped member 18 is a strap 24. The straps 24 are made of a hook and loop Velcro-type material. On the top surface 34 is a loop material and on the bottom surface and at the ends of each strap are a plurality of tiny hooks 36 which engage the loops of the top surface 34.

Located between the circular opening 22 of the top section 14 and the rear overhanging portion 38 of the top section 14 is a cavity 12 in the body 28. The cavity 12 is formed in the bottom section 16. The cavity 12 has sufficient dimensions to easily receive standard size personal stereos or recorders such as the stereo or recorder shown in phantom in FIG. 1. The bottom section 16 is also of sufficient and appropriate width for a pair of headphones to clamp onto opposite sides thereof as shown in phantom in FIG. 1. The body portion 28 is preferably formed from a hard plastic substance.

Figure 2:
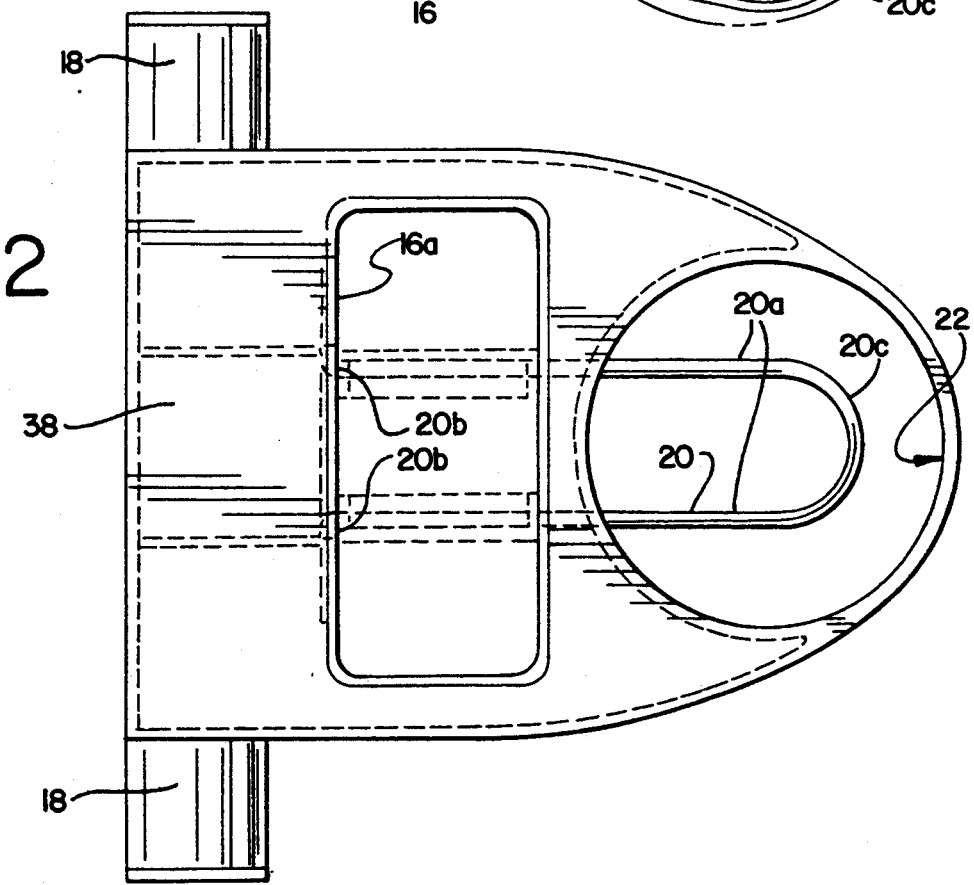
FIG. 2 is a top plan view of the combination beverage container and stereo holder device.

FIGS. 1, 2, 4 and 5 show a wire-type member 20 for supporting a beverage container 32. From a top view as shown in FIG. 2 the wire member 20 is generally U-shaped having two parallel extending legs 20a. From a side view as shown in FIG. 5 the extending legs 20a have hooked end portions 20b abutting against the bottom of the rear inside wall 16a of the bottom section 16. Each end portion 20b of the supporting wire member 20 is anchored in a recess 44 located at the bottom of the cavity 12. The wires 20a extend from the end portions 20b horizontally across the bottom of the recess 12 through two openings 42 in the bottom of the bottom section 16. Directly beyond the outside of the openings 42 the legs 20a have a 90 degree downward bend and extend a predetermined distance to a point below which the legs have a 90 degree horizontal bend and extend further outwardly horizontally a predetermined distance with the legs 20a terminating into one continuous semi-circular bend 20c in an area generally below the circular opening 22 of the body 28.

In use, the rear overhanging portion 38 of the top section 14 along with the inverted V-shaped members 18 extending from the rear overhanging portion 38 sit atop a horizontal bar 40, with the gaskets 19 between the members 18 and the bar 40. The body 28 is held securely to the bar 40 by tightly wrapping the straps 24 around the bar 40 and on top of the inverted V-shaped members 18, compressing the gaskets 19. The body 28 is locked on the bar 40 when the bottom surface of the ends of the straps 24 having the plurality of hooks 36 have been tightly wrapped over the top looped surfaces 34 of each strap 24 and pressed onto the top surfaces 34, securely engaging the plurality of hooks 26 into the loops of material 34.

Various changes can be made to the invention without departing from the spirit thereof or scope of the following claims.

What is claimed is:

1. A combination beverage container holder and stereo holder for mounting on a horizontal bar of exercise equipment, the holder comprising:
   a. an integrally formed body portion having a top section and a bottom section, said bottom section including a cavity formed within said body portion;
   b. a generally circular opening located at said top section end to accommodate a cylindrical object;
   c. a support means located beneath the circular opening and extending from said bottom section for supporting a cylindrical object; and
   d. a handle engaging means integral with and extending generally horizontally from said top section and having adapting means to engage a generally horizontal structural member portion of an exercising device, said engaging means further comprising gripping means frictionally engageable with said horizontal structural member.

2. A combination beverage container holder and stereo holder as in claim 1, whereas said bottom section is of a predetermined width sufficient to clamp a pair of headphones thereto.

3. A combination beverage holder and stereo holder as in claim 1, whereas said engagement means includes extending portions on opposite sides of said top section, and a securing strap attached to each extending portion, said securing strap having two sides wrapped around said extending portions.

4. A combination beverage holder and stereo holder as in claim 3, whereas said extending portions are inverted V-shaped members.

5. A combination beverage holder and stereo holder as in claim 3, whereas said straps have loop material on one side and hooking material on the other side, said hooking material being attached to said loop material when strap is wrapped around said horizontal structural member.

6. A combination beverage holder and stereo holder as in claim 3, including a gasket underlying each V-shaped member.

* * * * *